United States Patent Office 3,215,756
Patented Nov. 2, 1965

3,215,756
COATING COMPOSITIONS COMPRISING CARBOXYL CONTAINING COPOLYMER, EPOXIDE AND AMINO RESIN
Louis J. Lombardi, Howard J. Wright, and Paul F. Westfall, Kansas City, Mo., assignors to Cook Paint & Varnish Company, Kansas City, Mo., a corporation of Delaware
No Drawing. Filed Apr. 21, 1960, Ser. No. 23,656
8 Claims. (Cl. 260—834)

The present invention relates to certain heat-curable, resinous compositions which form water-insoluble, cross-linked polymers on baking.

The principal object of the invention is the preparation of novel resinous products which demonstrate a wide variety of useful characteristics. For example, these products may be used as film-forming components in coating compositions or the like. Other objects will also be hereinafter apparent.

According to one aspect of the invention, the present products comprise heat-curable mixtures of a vinyl polymer with an epoxy compound in the presence of an amino resin, e.g. urea-aldehyde and/or melamine-aldehyde resin, the amino resin apparently functioning as a curing agent when the mixture is baked. The invention also contemplates the cured, cross-linked vinyl polymers obtained by baking these mixtures. Essential details of the various components constituting the present products and other aspects of the invention, including preferred modes of operating in accordance therewith, are described below:

VINYL POLYMER CONSTITUENT

The vinyl polymer used as a component in preparing the products of the invention may be conveniently described as a copolymer of (a) an ethylenically unsaturated monomer containing at least one epoxy-reactive group selected from the class consisting of carboxylic acid and carboxylic anhydride groups and (b) a different ethylenically unsaturated monomer which is free from carboxylic acid and carboxylic anhydride groups, the latter monomer preferably being in excess. To be suitable herein, the vinyl polymer must have an acid number of 30 to 150, preferably 60 to 120.

Examples of epoxy-reactive monomers (a) are acrylic acid; acrylic acid substituted in the alpha carbon by lower alkyl, e.g. methacrylic acid; maleic acid and maleic anhydride.

The other monomeric component (b) is characterized by the group $H_2C=C<$ and may be styrene, α-substituted lower alkyl styrenes such as α-methyl styrene, alkyl esters of acrylic and methacrylic acids, especially the lower alkyl esters thereof, e.g. methyl methacrylate, methyl and ethyl acrylate, and mixtures of these materials. The relative amounts of monomers (a) and (b) in the copolymer may be varied but, in any event, the copolymer must comprise sufficient amounts of monomers (a) and (b) to give an acid number within the limits indicated heretofore.

The vinyl copolymer starting component may be prepared in conventional fashion, e.g. by heating monomers (a) and (b) at elevated temperatures, usually of the order of 90 to 140° C., preferably 115° C. to 125° C. This polymerization may be carried out in bulk or in solution using such conventional solvents as aromatic hydrocarbons, typically benzene, toluene and xylene, or alcohols (e.g. butyl alcohol or cellosolve) and the like. Usually, the desired polymerization is completed in up to about 10–15 hours, depending upon other operating conditions, e.g. the monomers involved, the temperature, etc.

The polymerization is preferably carried out in the presence of a polymerization catalyst, typically, peroxides such as benzoyl peroxide, di-tertiarybutyl-peroxide, di-cumene peroxide and methyl-ethyl ketone peroxide, or other catalysts of the free-radical type.

The preparation of various vinyl copolymers suitable for use according to the invention is described below:

Example I

The following mix, in weight percent, was prepared:

| | Percent |
|---|---|
| Styrene | 55 |
| α-Methyl styrene | 17 |
| Maleic anhydride | 27 |
| Di-tert butyl peroxide | 0.5 |
| Benzoyl peroxide | 0.5 |

These materials were polymerized in solution in butyl alcohol by heating at a temperature of about 115–125° C., for 10–15 hours. The mixture was then cooled. The resulting product had an acid number of 110 and a viscosity of Z5 (Gardner-Holdt). It was 60% by weight nonvolatiles (polymer) and had a weight per gallon of 8.36 pounds.

An essentially equivalent copolymer may also be obtained by polymerizing the indicated mixture by solution polymerization in cellosolve.

In lieu of the starting mixture indicated above, the following typical reaction mixtures may be used in the same manner:

Example II

| | Percent |
|---|---|
| Styrene | 40 |
| α-Methyl styrene | 38 |
| Acrylic acid | 20 |
| Benzoyl peroxide | 1 |
| Di-tertiary butyl peroxide | 1 |

The resulting product had the following characteristics:

| | | |
|---|---|---|
| Acid number | about | 114 |
| Viscosity | | Z5 |
| Nonvolatiles | percent | 57 |
| Weight/gallon | pounds | 8 |

Example III

| | Percent |
|---|---|
| Styrene | 36 |
| α-Methyl styrene | 32 |
| Methacrylic acid | 21 |
| Di-butyl maleate | 9 |
| Benzoyl peroxide | 1 |
| Di-tertiary butyl peroxide | 1 |

The product had the following characteristics:

| | | |
|---|---|---|
| Acid number | | 98 |
| Viscosity | | Z3 |
| Nonvolatiles | percent | 48 |
| Weight/gallon | | 7.95 |

Example IV

| | Percent |
|---|---|
| Methacrylic acid | 24 |
| Methyl acrylate | 74 |
| Benzoyl peroxide | 1 |
| Di-tertiary butyl peroxide | 1 |

The product had the following characteristics:

| | | |
|---|---|---|
| Acid number | | 71 |
| Viscosity | | Z2 |
| Nonvolatiles | percent | 59 |
| Weight/gallon | | 8.20 |

Example V

| | Percent |
|---|---|
| Styrene | 82 |
| Maleic anhydride | 16 |
| Benzoyl peroxide | 1 |
| Di-tertiary butyl peroxide | 1 |

The product had the following characteristics:

| | |
|---|---|
| Acid number | 65.0 |
| Viscosity | light Z6 |
| Nonvolatiles percent | 58 |
| Weight/gallon | 8.17 |

Example VI

| | Percent |
|---|---|
| Methyl methacrylate | 80 |
| Methacrylic acid | 18 |
| Benzoyl peroxide | 1 |
| Di-tertiary butyl peroxide | 1 |

The product had the following characteristics:

| | |
|---|---|
| Acid number | 82.0 |
| Viscosity | heavy Z6 |
| Nonvolatiles percent | 48.0 |
| Weight/gallon | 7.94 |

Example VII

The procedure of Example I was repeated substituting the following materials:

| | Percent |
|---|---|
| Styrene | 39 |
| 2-ethyl hexyl acrylate | 38 |
| Acrylic acid | 21 |
| Benzoyl peroxide | 1 |
| Di-tertiary butyl peroxide | 1 |

The product had the following characteristics:

| | |
|---|---|
| Acid number | 145.0 |
| Viscosity | Z3 |
| Nonvolatiles percent | 53 |
| Weight/gallon | 7.88 |

Example VIII

| | Percent |
|---|---|
| Styrene | 47 |
| α-Methyl styrene | 47 |
| Acrylic acid | 4 |
| Benzoyl peroxide | 1 |
| Di-tertiary butyl peroxide | 1 |

The products had the following characteristics:

| | |
|---|---|
| Acid number | 32.0 |
| Viscosity | U-V |
| Nonvolatiles percent | 50 |
| Weight/gallon | 8.06 |

It will be appreciated that various other vinyl copolymers, in addition to those described above, may be used herein for the purposes of the present invention.

EPOXY CONSTITUENT

The epoxy constituent or epoxide employed in this invention is characterized by the presence of one or more epoxy groups having the formula

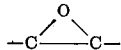

in the molecule. In general, the epoxide contains two or more epoxy groups per molecule so that it can effectively serve as a cross-linking agent. A wide variety of epoxy materials may be employed and a large number of commercially available epoxies have been tested and found satisfactory. Representative commercial types include those sold under the names "Epon 828," "Admex 710" and "PAGE." Of these products, "Epon 828" is a polyglycidyl ether of Bisphenol A, which is 2,2'-di(p-hydroxyphenyl) propane prepared by condensation of the phenol with epichlorohydrin. "Epon 828" is further characterized as a liquid having an epoxide equivalent of about 175 to 210 grams per gram chemical equivalent of epoxy groups, an average molecular weight of 350 to 400 and a viscosity in 40% butyl Carbitol at 25° C., of 5,000 to 15,000 centipoises. Other epoxide compounds having the same general formula of higher or lower molecular weight are available and suitable for use herein. In general, the molecular weight for such epoxy materials is between 340 and 3,8000, although epoxy materials with other molecular weights can be used.

"Admex 710" is an epoxidized oil derivative in which a naturally occurring unsaturated oil or the equivalent has been reacted with an oxygenating agent such an oxygen with selective metal catalysts, perbenzoic acid, acetaldehyde mono-peracetate and peracetic acid. Oils which can be epoxidized in this way include soy bean oil and linseed oil. The epoxidized oils have 3 to 4 epoxy groups per mole. The preparation of these materials has been described in the chemical literature (see, for example, the Encyclopedia of Chemical Technology, First Supplement (1957), pages 638 and 639).

"PAGE" is a polyallyl glycidyl ether having the formula:

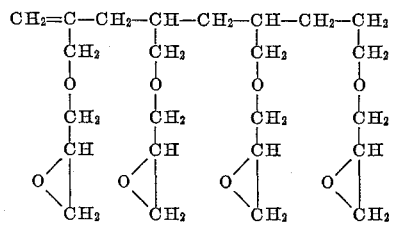

Poly (allyl glycidyl ether) is a mixture of low-molecular-weight polymers of the type shown having an average molecular weight of about 460 and an average number of epoxy groups per molecule of about 3.5.

Other types of epoxy materials may be used. In particular, the glycidyl ether derivatives of phenols similar to those of bisphenol A as illustrated by "Epon 828" may be used. Other di-hydroxy compounds which are used in the preparation of epoxy materials include di-(p-hydroxyphenyl) methane known as bisphenol F, 4,4'-dihydroxy biphenyl, and other aromatic mononuclear and aromatic polynuclear polyhydroxy compounds. Epoxide 201 (3,4-epoxy-6-methylcyclohexylmethyl-3,4-epoxy - 6 - methylcyclohexane carboxylate); dipentene dioxide (limonene dioxide) and dicyclopentadiene dioxide (endo isomer) are other epoxy compounds suitable for use herein.

AMINO RESIN CONSTITUENT

As noted heretofore, the amino resin constituent, typically urea and/or melamine resin functions as curing agent for the vinyl/epoxy mixture and may comprise the water-insoluble heat condensation product of formaldehyde and either urea or melamine, or mixtures thereof. This constituent may be prepared by heat condensation in the presence of conventional catalysts, e.g. triethanolamine or NH₄OH and phthalic anhydride or maleic anhydride at 70° C. to 130° C., for periods of time ranging from 8 to 12 hours. Usually, from 2 to 6 mols of formaldehyde for each mol of urea and/or melamine give satisfactory products. Polymers of formaldehyde, e.g. para formaldehyde, may be used in lieu of formaldehyde. Typical aldehyde resins for use herein are Rohm & Haas F200–E (urea-formaldehyde) or Resimene 881 (Monsanto, melamine-formaldehyde resin).

The following examples show typical preparations of suitable urea and melamine resin constituents, parts and percentages being by weight unless otherwise stated:

Example IX 72.9 parts of butyl forcel (40% formaldehyde solution in butanol), 26.5 parts of urea, .005 part of triethanolamine and .5 part of phthalic anhydride were heated to reflux at a temperature of about 95° C. and the water removed azeotropically until a solution at 50% non-volatiles in equal parts of butanol and zylol has a viscosity of W–Z (Gardner-Holdt). The resulting resinous solution is ready for use according to the invention.

Example X 20.6 parts of melamine, 61.4 parts of butyl formcel, 17.4 parts of butyl alcohol, 0.15 part of phthalic anhydride and 0.33 part of magnesium carbonate were heated to reflux and water removed azeotropically until a solution at 50% non-volatiles in equal parts of butanol and zylol has a viscosity of L–P (Gardner-Holdt). The resulting resinous solution in butanol/zylol may be used directly for preparing products of the invention.

VINYL/EPOXY/AMINO-RESIN

According to the invention, the vinyl, epoxy and amino-resin constituents described above are thoroughly mixed together, usually in the cold, i.e. room temperature. In some cases, it may be desirable to partially react the ingredients by moderately heating same (30° to 90° C.) while mixing although this partial reaction before baking is not necessary in all cases.

While proportions can be fairly widely varied, it is generally desirable to use sufficient vinyl copolymer and epoxy compound to provide approximately equivalent amounts of acid groups in the copolymer and epoxy groups in the epoxy compound. The amino resin should be used in approximately equal weight to the epoxy compound. One especially preferred mix comprises 50% vinyl copolymer containing acid groups, 25% amino resin and 25% epoxy containing epoxide groups, the acid and epoxide groups being present in equivalent amounts.

The following specific examples illustrate typical compositions prepared according to the invention using the vinyl, epoxy and urea or melamine materials heretofore described, parts being by weight unless otherwise specified.

Example XI 40 parts of the vinyl copolymer solution prepared in Example I were mixed with 12 parts of epoxy (i.e. Epon 828) and 20 parts of the urea-formaldehyde resin solution prepared in Example IX at room temperature (20° C.). The resulting mix was applied directly to a metal substrate (e.g. cold rolled steel) and cured by baking at about 200° C., for about 30 minutes. A highly satisfactory film was obtained on the substrate. Other metal substrates, e.g. Bonderite or the like, may also be used.

Example XII 40 parts of the resin solution prepared in Example II were mixed with 12 parts of liquid epoxy (i.e. Araldite 6010, Ciba) and 24 parts of the melamine resin solution prepared in Example X and the resulting product was coated onto a substrate, all in the manner of Example XI with satisfactory results.

It will be appreciated that, in addition to the vinyl/epoxy/amino products exemplified above, highly desirable films are also obtainable using any other combination of the indicated constituents within the limits prescribed. These constituents are used, as indicated, in conjunction with any appropriate organic solvent and/or other diluent in sufficient amount to give a desirable coating viscosity. The diluent may be added at the time of mixing if desired or in the preparation of the individual components. Usually, these mixtures with appropriate diluent, will require baking at temperatures between 150° and 210° C., preferably 115° to 210° C., for from 15 to 30 minutes to give an effective film. Other conventional ingredients for coating compositions, e.g. fillers, pigments, etc., may also be included therein.

While preferred embodiments of the invention have been described above, various modifications may be made therein without departing from the scope of the invention as set forth in the claims.

We claim:
1. A method of making an organic coating on surfaces which comprises simultaneously mixing as the sole essential reacting constituents at an elevated temperature between 30 and 90° C. in the presence of a non-aqueous organic solvent
   (1) a vinyl copolymer having an acid number between 30 and 150 which is a copolymer of monomers consisting essentially of
      (a) a member of the group consisting of acrylic acid, acrylic acids substituted in the alpha position with lower alkyl, maleic acid and maleic anhydride, and
      (b) an ethylenically unsaturated monomer selected from the group consisting of styrene, styrenes substituted with lower alkyl in the alpha position, alkyl esters of acrylic acid and alkyl esters of acrylic acid substiuted in the alpha position with lower alkyl,
   (2) an epoxy compound characterized by the presence of at least one epoxy group per molecule and selected from the group consistings of polyglicydyl ethers of aromatic polyhydroxy compounds, epoxidized unsaturated oils, polyallyl glycidyl ethers, 3,4-epoxy-6-methylcyclohexylmethyl - 3,4 - epoxy-6-methylcyclohexane carboxylate, dipentene dioxide and dicyclopentadiene dioxide, and
   (3) an amino resin selected from the group consisting of urea-formaldehyde and melamine-formaldehyde condensates,
the amount of said vinyl copolymer and epoxy compound being such that said composition contains approximately equivalent amounts of epoxy-reactive groups and epoxy groups, coating a metal substrate with the resultant mixture and then baking the substrate at a temperature between 150° and 210° C. for 30 to 15 minutes.

2. A method of making an organic coating as set forth in claim 1 in which the vinyl copolymer is a copolymer containing maleic anhydride.

3. A method of making an organic coating as set forth in claim 1 in which the vinyl copolymer is a copolymer containing acrylic acid.

4. A method of making an organic coating as set forth in claim 1 in which the vinyl copolymer is a copolymer containing methacrylic acid.

5. A method of making an organic coating as set forth in claim 1 in which the vinyl copolymer is a copolymer containing styrene.

6. A method of making an organic coating as set forth in claim 1 in which the vinyl copolymer is a copolymer containing α-methyl styrene.

7. A method of making an organic coating as set forth in claim 1 in which the vinyl copolymer is a copolymer containing methyl methacrylate.

8. A method of making an organic coating on surfaces as set forth in claim 1 in which the epoxy compound is the polyglycidyl ether of 2,2'-di(p-hydroxyphenyl) propane.

References Cited by the Examiner

UNITED STATES PATENTS

| | | | |
|---|---|---|---|
| 2,787,603 | 4/57 | Sanders | 260—844 |
| 2,931,742 | 4/60 | Hicks | 260—851 |
| 3,014,881 | 12/61 | LaBarre | 260—18 |

MURRAY TILLMAN, *Primary Examiner.*

DONALD ARNOLD, LEON J. BERCOVITZ, WILLIAM H. SHORT, *Examiners.*